(12) United States Patent
Baek et al.

(10) Patent No.: US 9,955,550 B2
(45) Date of Patent: Apr. 24, 2018

(54) ELECTRONIC DEVICE AND METHOD FOR SETUP OF LIGHTING DEVICE

(71) Applicant: Samsung Electronics Co., Ltd., Suwon-si. Gyeonggi-do (KR)

(72) Inventors: Du-San Baek, Seoul (KR); Soon-Hyung Gwon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/730,789

(22) Filed: Jun. 4, 2015

(65) Prior Publication Data

US 2015/0359068 A1    Dec. 10, 2015

(30) Foreign Application Priority Data

Jun. 5, 2014   (KR) .......................... 10-2014-0068375

(51) Int. Cl.
*H05B 37/02* (2006.01)
(52) U.S. Cl.
CPC ....... *H05B 37/0218* (2013.01); *H05B 37/029* (2013.01); *H05B 37/0272* (2013.01); *Y02B 20/48* (2013.01)
(58) Field of Classification Search
CPC ...................................................... H05B 37/02
USPC ........................................ 315/152, 307, 312
See application file for complete search history.

(56) References Cited

U.S. PATENT DOCUMENTS

| 8,159,156 | B2 | 4/2012 | Henig et al. |
| 2002/0154025 | A1 | 10/2002 | Ling |
| 2008/0074872 | A1 | 3/2008 | Panotopoulos |
| 2011/0140612 | A1* | 6/2011 | Mohan ............... H05B 37/0218 315/149 |
| 2012/0101556 | A1 | 4/2012 | Baaijens et al. |
| 2012/0105204 | A1 | 5/2012 | Van Beeck |
| 2013/0271004 | A1* | 10/2013 | Min ................... H05B 33/0842 315/112 |
| 2013/0320862 | A1 | 12/2013 | Campbell et al. |

(Continued)

FOREIGN PATENT DOCUMENTS

| EP | 2434842 A1 | 3/2012 |
| WO | 2008/142603 A2 | 11/2008 |

(Continued)

OTHER PUBLICATIONS

European Search Report dated Jan. 22, 2018, issued in European Application No. 15803519.6.

*Primary Examiner* — Tung X Le

(74) *Attorney, Agent, or Firm* — Jefferson IP Law, LLP

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. An electronic device and an operation method for setup of a lighting device are provided. The operation method includes transmitting a control signal corresponding to at least one lighting device, acquiring lighting output information of the at least one lighting device, and determining a group of the at least one lighting device based on the lighting output information and the control signal.

20 Claims, 14 Drawing Sheets

(56) References Cited

U.S. PATENT DOCUMENTS

| | | | | |
|---|---|---|---|---|
| 2014/0028199 A1* | 1/2014 | Chemel | ............. | H05B 33/0854 |
| | | | | 315/152 |
| 2014/0168967 A1* | 6/2014 | Itami | ...................... | F21V 21/15 |
| | | | | 362/233 |
| 2014/0186049 A1* | 7/2014 | Oshima | ............. | H04B 10/1143 |
| | | | | 398/118 |
| 2014/0300279 A1* | 10/2014 | Yamazaki | .......... | H05B 37/0272 |
| | | | | 315/158 |

FOREIGN PATENT DOCUMENTS

| | | | |
|---|---|---|---|
| WO | 2010122457 | A2 | 10/2010 |
| WO | 2011086501 | A1 | 7/2011 |
| WO | 2014037866 | A1 | 3/2014 |

\* cited by examiner

ELECTRONIC DEVICE AND METHOD FOR SETUP OF LIGHTING DEVICE

CROSS-REFERENCE TO RELATED APPLICATION(S)

This application claims the benefit under 35 U.S.C. § 119(a) of a Korean patent application filed on Jun. 5, 2014 in the Korean Intellectual Property Office and assigned Serial number 10-2014-0068375, the entire disclosure of which is hereby incorporated by reference.

TECHNICAL FIELD

The present disclosure relates to setup of a lighting device.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, a Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

For one example, a technology for controlling a lighting device in a smartphone of a user is being studied.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for setup of a lighting device, capable of intuitively setting up a group or zone of lighting devices located in a certain area in an electronic device.

In accordance with an aspect of the present disclosure, a method of an electronic device is provided. The method includes transmitting a control signal corresponding to at least one lighting device, acquiring lighting output information of the at least one lighting device, and determining a group of the at least one lighting device based on the lighting output information and the control signal.

In accordance with another aspect of the present disclosure, an electronic device is provided. The electronic device includes a transceiver configured to transmit a control signal corresponding to at least one lighting device and a processor configured to acquire lighting output information of the at least one lighting device, and determine a group of the at least one lighting device based on the lighting output information and the control signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 to 12 used to describe the principles of the present disclosure in the patent specification are merely for illustration, and must not be interpreted as limiting the scope of the present disclosure. A person having ordinary knowledge in the art will understand that the principles of the present disclosure may be implemented even in a properly arranged any wireless communication system.

Figure 1:
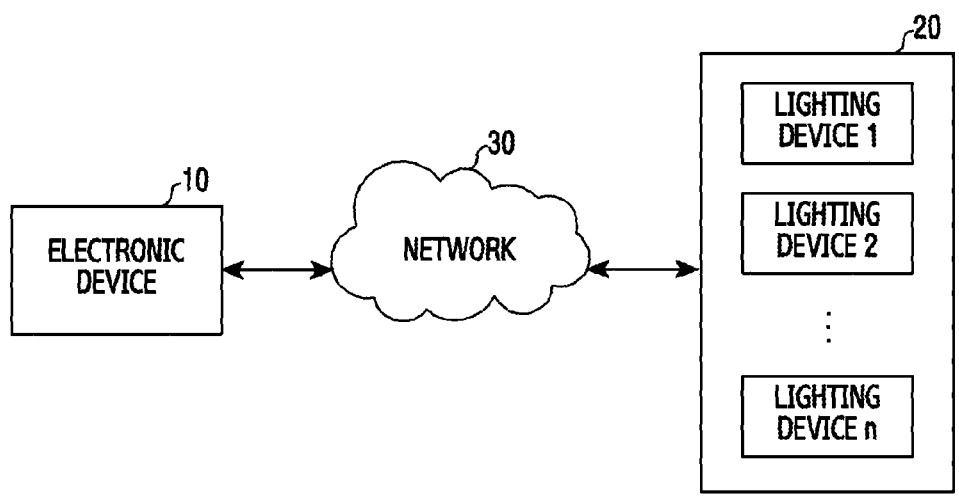
FIG. 1 is a block diagram illustrating a network system for setup of a light device according to an embodiment of the present disclosure.

FIG. 1 is a block diagram illustrating a network system for setup of a light device according to an embodiment of the present disclosure.

Referring to FIG. 1, the network system may include an electronic device 10, lighting devices 20, and a network 30.

The electronic device 10 is a device for performing an operation of setup of one or more lighting devices 20 in the network system. The electronic device 10 may include a smartphone, a tablet Personal Computer (PC), a notebook computer, a mobile communication terminal, and a portable terminal. For example, the electronic device 10 may include at least one of a smartphone, a tablet PC, a mobile phone, a video phone, an electronic book (e-book) reader, a desktop PC, a laptop PC, a netbook computer, a Personal Digital Assistant (PDA), a Portable Multimedia Player (PMP), a Motion Picture Experts Group (MPEG) Audio layer 3 (MP3) player, a mobile medical instrument, a camera, or a wearable device (e.g., a Head-Mounted Device (HMD) such as electronic glasses), electronic clothes, an electronic bracelet, an electronic necklace, an appcessory, an electronic tattoo, or a smart watch. Also, the electronic device 10 may be a gateway (or a server) enabling a plurality of devices included in a network system to connect to an external communication network.

The electronic device 10 may be physically divided into a portable terminal and at least one gateway to perform a function, or may be integrated as one device to perform a function. Also, the electronic device 10 may perform communication with the lighting devices 20 via a control means (not shown) for taking charge of control of lighting of the lighting devices 20. The electronic device 10 may include at least one sensor. For example, the electronic device 10 may include at least one camera sensor, and/or at least one illumination sensor. According to an embodiment of the present disclosure, in case that the electronic device 10 is divided into a portable terminal and at least one gateway, each gateway is connected with at least one camera sensor and/or at least one illumination sensor, and communicates with the connected sensors.

The lighting devices 20, which are devices emitting lighting according to an On/Off control instruction, are connected with the electronic device 10 by a wired or wireless network. These lighting devices 20 include all lighting devices in which On/Off of lighting, On/Off time, and brightness are controllable by a control means. The lighting devices 20 may be divided into Zigbee lighting devices, Bluetooth Low Energy (BLE) lighting devices, and Z-wave lighting devices in accordance with a communication means, and include a Light Emitting Diode (LED), a fluorescent lamp, a glow lamp, and a halogen lamp in accordance with the kind of lighting.

The network 30 is a network for performing communication between the electronic device 10 and the lighting devices 20. This network 30 includes a wired or wireless network.

Figure 2:
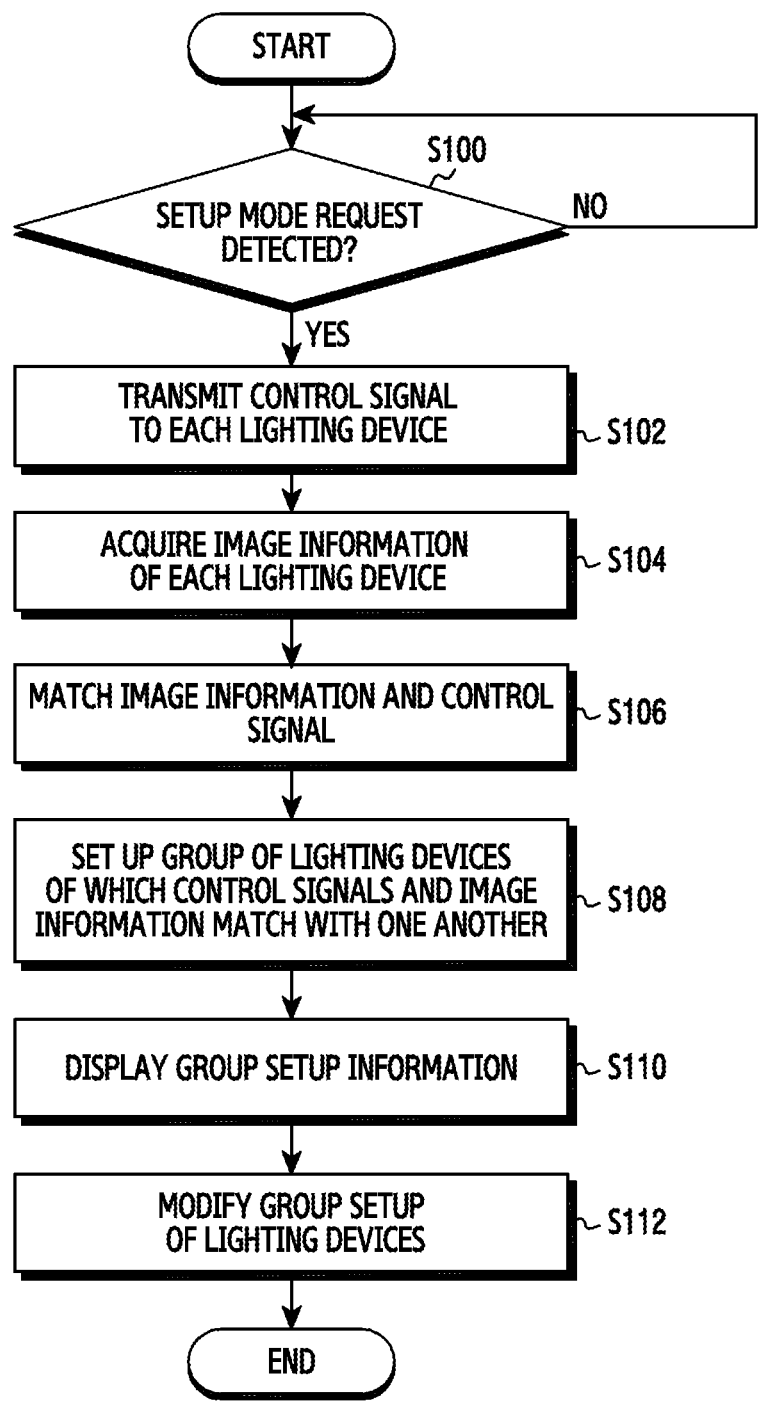
FIG. 2 is a flowchart describing a method for setup of a lighting device in an electronic device according to an embodiment of the present disclosure.

FIG. 2 is a flowchart describing a method for setup of a lighting device in an electronic device according to an embodiment of the present disclosure.

Referring to FIG. 2, the electronic device 10 determines if a request for a setup mode of a lighting device is detected at operation S100. For instance, the electronic device 10 determines if a user or manager requests the setup mode of the lighting device through a user interface unit. The electronic device 10 periodically determines request or non-request for the setup mode of the lighting device. For example, the electronic device 10 may periodically detect if a specific button for automatically setting up a group or zone of lighting devices is selected. For instance, if the setup mode request is not detected at operation S100, the electronic device 10 periodically repeats determination on the setup mode request.

If the request for the setup mode of the lighting device is detected at operation S100, the electronic device 10 transmits a control signal corresponding to each of at least one lighting device, to each of the lighting devices at operation S102. For example, if the request for the setup mode of the lighting device is detected, the electronic device 10 transmits a control signal instructing On/Off of each of the lighting devices located in a certain area. Here, the certain area may be an area such as a living room of a home, a kitchen, a large room, and a small room or be an area including all of these areas, and may be divided areas within an office or be an area including all of these areas. The control signal is a control signal for providing unique On/Off or brightness to each lighting device. The kind of control signal includes an On/Off frequency of a lighting device, an On/Off duty cycle, or binary data for controlling On/Off. Accordingly, the control signal may include a different On/Off frequency, On/Off duty cycle, or On/Off binary data for each of the lighting devices. This control signal is transmitted to each of the lighting devices. For example, an On/Off frequency of a control signal to be transmitted to a first lighting device and an On/Off frequency of a control signal to be transmitted to a second lighting device may be different from each other.

After operation S102, the electronic device 10 acquires image information of each of the lighting devices, which are controlled according to the control signals at operation S104. For example, the electronic device 10 may acquire an image including On/Off related information of each lighting device. A method for acquiring the image information of each of the lighting devices is described with reference to FIGS. 3 to 5 below.

Figure 3:
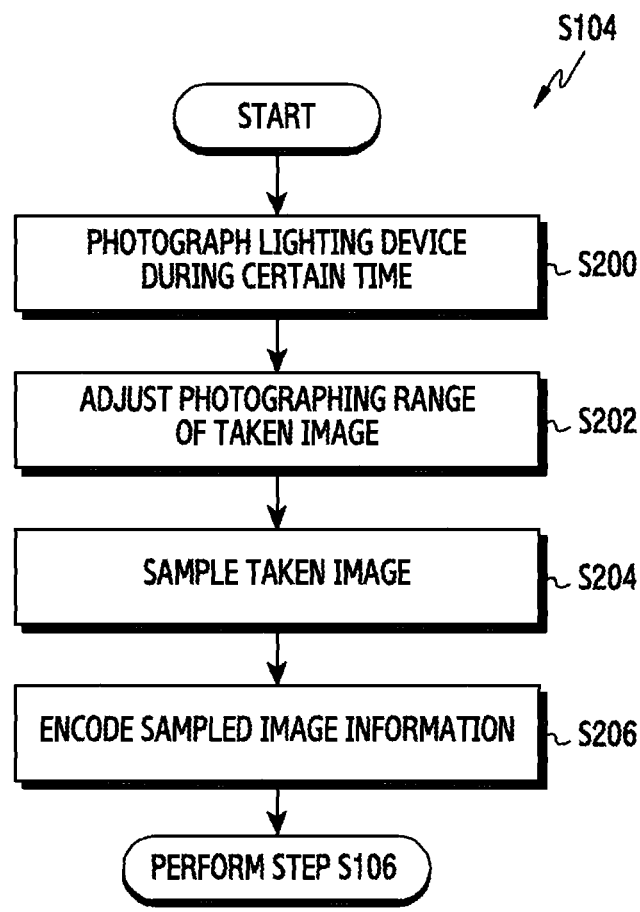
FIG. 3 is a flowchart describing an operation of detecting image information about a lighting device illustrated in FIG. 2.

FIG. 3 is a flowchart describing an operation of acquiring image information about a lighting device illustrated in FIG. 2.

Referring to FIG. 3, the electronic device 10 photographs, during a certain time, lighting devices, which turn On/Off according to control signals at operation S200.

Figure 4:
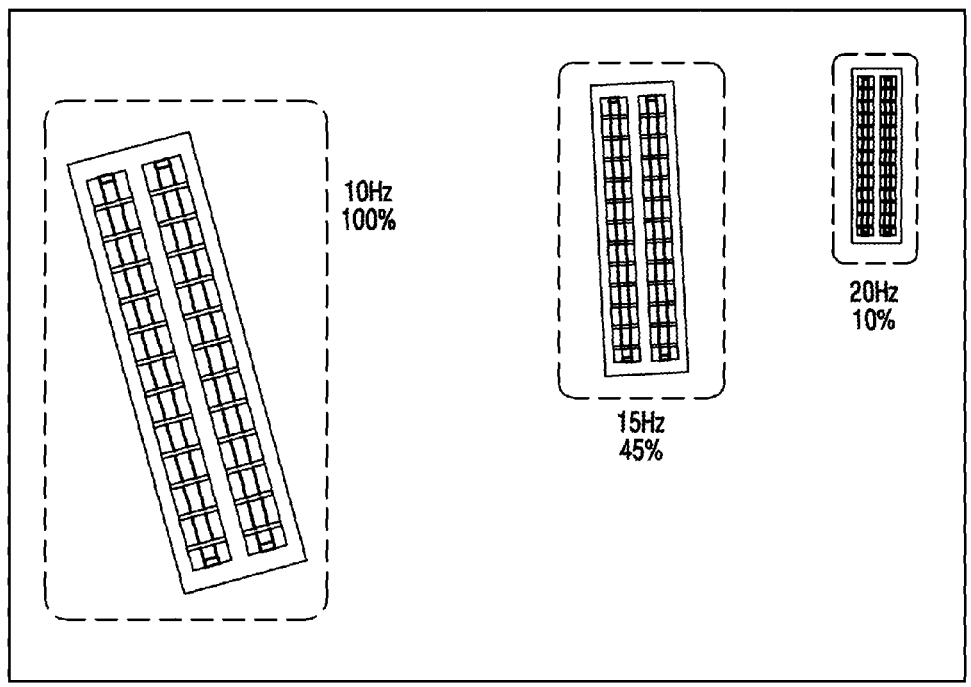
FIG. 4 is a reference diagram illustrating an image photographing a plurality of lighting devices located in a certain area according to an embodiment of the present disclosure.

FIG. 4 is a reference diagram illustrating an image photographing a plurality of lighting devices located in a certain area according to an embodiment of the present disclosure.

Referring to FIG. 4, the electronic device 10 photographs, during a certain time, lighting devices corresponding to respective On/Off frequencies of 10 Hertz (Hz), 15 Hz, and 20 Hz. In this context, the electronic device 10 photographs a plurality of lighting devices in a manner that the plurality of lighting devices are included on one screen. Upon photographing, the electronic device 10 may minimize an exposure of a camera to distinguish the respective lighting devices.

Also, when photographing the plurality of lighting devices, the electronic device 10 may also sequentially photograph each of the plurality of lighting devices. That is, the electronic device 10 may also, instead of photographing in a fixed direction a certain area where the plurality of lighting devices are located, change a photographing direction while sequentially photographing the plurality of lighting devices during a certain time as taking a panorama image, such that the plurality of lighting devices are included on one shot screen. For example, the electronic device 10 may change the direction of the electronic device 10 and face to some of the plurality of lighting devices to photograph some lighting devices during a certain time and, thereafter, the electronic device 10 may change the direction of the electronic device 10 to photograph the remnant lighting devices during a certain time.

After operation S200, the electronic device 10 adjusts a photographing range of a taken image at operation S202. For instance, the electronic device 10 uses a screen size adjustment module to magnify or reduce a size of a range of a taken image, or use a range selection module to select a certain range of the taken image. Operation S202 does not have to be performed as it is not essential. According to need, operation S202 may not be performed such that, after operation S200, operation S204 may be performed.

After operation S202, the electronic device 10 samples an image of the adjusted photographing range at operation S204. For instance, the electronic device 10 samples an image, which is taken during a certain time, by periods of a certain sampling time. In case that a sampling frequency is not secured at sampling, the electronic device 10 may exploit an equivalent time sampling technique, i.e., a technique of delaying a sampling period of a taken image as much as a certain interval and sampling.

Figure 5:
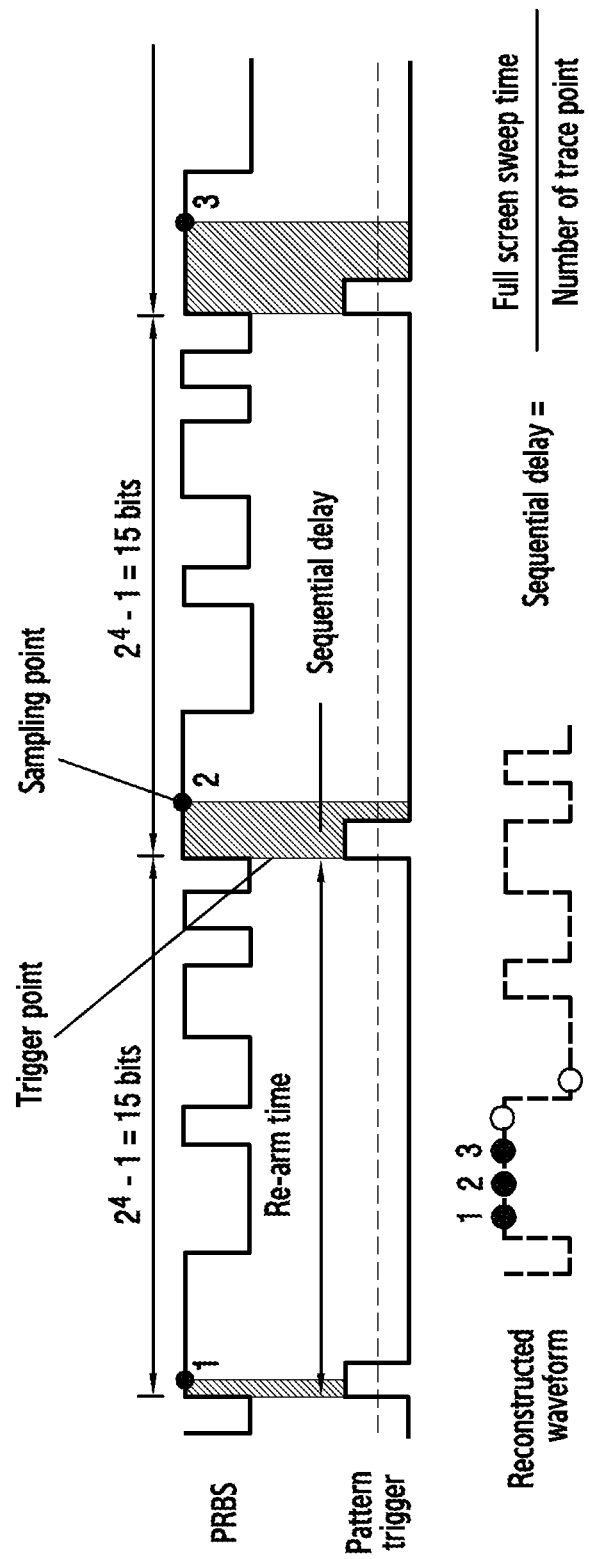
FIG. 5 is an illustrative reference diagram describing sampling using an equivalent time sampling technique according to an embodiment of the present disclosure.

FIG. 5 is an illustrative reference diagram describing sampling using the equivalent time sampling technique according to an embodiment of the present disclosure.

Referring to FIG. 5, the equivalent time sampling technique refers to a technique of gathering samples from continuously repeated signals at a certain time interval to form a waveform. For instance, the equivalent time sampling technique represents a technique of synthesizing a waveform of one period with samples obtained from repeated signals while changing a time-axis value. That is, the equivalent time sampling technique is a technique of accumulating a certain delay time on a sampling period and sampling repeated signals. Accordingly, in case that sampling signals relatively faster repeated than the sampling period, the electronic device 10 uses the equivalent time sampling.

After operation S204, the electronic device 10 encodes the sampled image information at operation S206. The electronic device 10 may exploit a method of tracing a state of a point of a high brightness within an image recognized as a light source, or a method of extracting a difference image of images before and behind an image taken at a certain period), to encode and extract the image information. That is, the electronic device 10 uses image information corresponding to a difference of the sampled image information, to encode the image information.

Extracting the image information is described with reference to Table 1 below.

TABLE 1

| frame | 0 | 1 | 2 | 3 | 4 | 5 | 6 | 7 | 8 | 9 |
|---|---|---|---|---|---|---|---|---|---|---|
| lighting 1 | ON | OFF | ON | OFF | ON | OFF | ON | OFF | ON | OFF |
| lighting 2 | ON | ON | OFF | OFF | ON | ON | OFF | OFF | ON | ON |

It is assumed that, as a result of extracting a light source from an image of each frame in the electronic device 10, two light sources are discovered, and states of the light sources are given as in Table 1 above. For example, Table 1 shows that lighting 1 is in an On state in 0th, 2nd, 4th, 6th, and 8th frames, and is in an Off state in 1st, 3rd, 5th, 7th, and 9th frames, and shows that lighting 2 is in an On state in 0th, 1st, 4th, 5th, 8th, and 9th frames, and is in an Off state in 2nd, 3rd, 6th, and 7th frames.

As in Table 1, in a situation in which lighting turns On/Off to indicate a frequency, in case that an image is taken with 10 frames, a time interval between frames is equal to 0.1 second (s) (=1 s/10 frames). Accordingly, it may be determined that the lighting 1 operates at 5 Hz by a signal of 0.2 s, and the lighting 2 operates at 2.5 Hz by a signal of 0.4 s.

After operation S104, the electronic device 10 may match the acquired image information with the control signal of each of the lighting devices at operation S106. A process of matching the encoded image information and the control signals respectively is described with reference to FIG. 4. For example, the electronic device 10 may determine that the respective lighting devices are lighting devices corresponding to the On/Off frequencies of 10 Hz, 15 Hz, and 20 Hz, through the encoding of the image information of the lighting devices of FIG. 4. Accordingly, the electronic device 10 may identify the On/Off frequencies of 10 Hz, 15 Hz, and 20 Hz corresponding to the image information of the respective lighting devices, through the encoding of the image information, thereby matching the control signal consistent with the corresponding On/Off frequency.

After operation S106, the electronic device 10 sets up a group of the lighting devices of which the control signals and the image information are matched with one other among the lighting devices at operation S108. For example, as illustrated in FIG. 4, in case that three lighting devices having the On/Off frequencies of 10 Hz, 15 Hz, and 20 Hz are included in one image information, the electronic device 10 sets up the same group of the three lighting devices that are included in the one image information. Unlike the scheme of the related art in which a plurality of lighting devices are set up as a group according to a user's input, an embodiment of the present disclosure makes intuitive and efficient grouping of the lighting devices possible in that the lighting devices included in the taken image may be set up as the same group.

After operation S108, the electronic device 10 displays group setup information about the lighting devices of which the group is set up at operation S110. For example, as illustrated in FIG. 4, if the three lighting devices having the On/Off frequencies of 10 Hz, 15 Hz, and 20 Hz are set up as the same group, the electronic device 10 displays, as the group setup information, identification information of the respective lighting devices included in the corresponding group and group identification information corresponding to this.

After operation S110, the electronic device 10 modifies the group setup of the lighting devices included in the group setup information at operation S112. For example, the electronic device 10 deletes or adds, according to a user's selection, some or all of the lighting devices belonging to the corresponding group in the group setup information.

Figure 6:
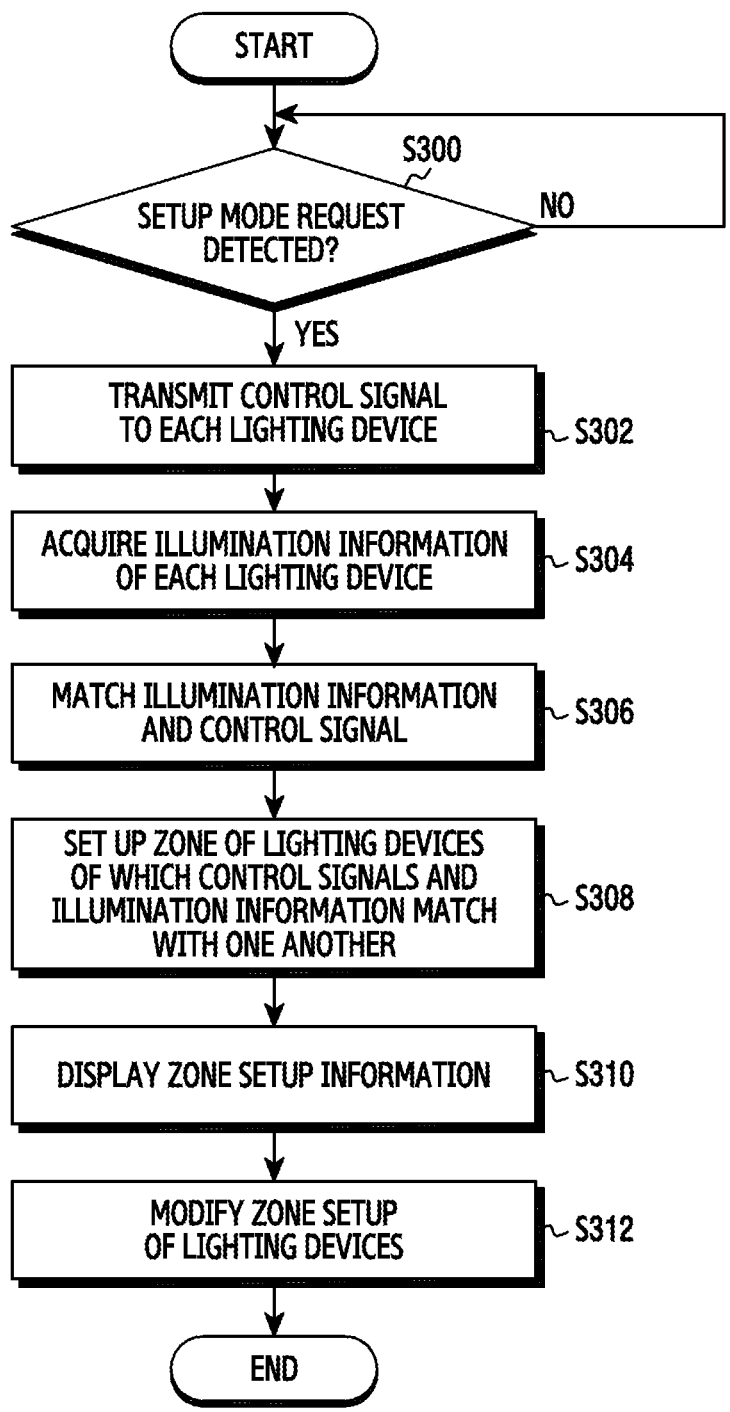
FIG. 6 is a flowchart describing a method for setup of a lighting device in an electronic device according to an embodiment of the present disclosure.

FIG. 6 is a flowchart describing a method for setup of a lighting device in an electronic device according to an embodiment of the present disclosure.

Referring to FIG. 6, the electronic device 10 determines if a request for a setup mode of a lighting device is detected at operation S300. For instance, the electronic device 10 determines if a user or manager requests the setup mode of the lighting device through a user interface unit. The electronic device 10 periodically determines request or non-request for the setup mode of the lighting device. For example, the electronic device 10 may periodically detect if a specific button for automatically setting up a group or zone of lighting devices is selected. If the setup mode request is not detected at operation S300, the electronic device 10 periodically repeats determination on the setup mode request.

If the request for the setup mode of the lighting device is detected at operation S300, the electronic device 10 transmits a control signal corresponding to each of at least one lighting device, to each of the lighting devices at operation S302. If the request for the setup mode of the lighting device is detected, the electronic device 10 transmits a control signal instructing On/Off of each of the lighting devices located in a certain area. The control signal may request for control of On/Off or brightness by each lighting device. The kind of the control signal includes an On/Off frequency of a lighting device, an On/Off duty cycle, or binary data for controlling On/Off. Accordingly, the control signal may include a different On/Off frequency, On/Off duty cycle, or On/Off binary data for each of the lighting devices. This control signal is transmitted to each of the lighting devices.

After operation S302, the electronic device 10 acquires illumination information of each of the lighting devices, which are controlled according to the control signals at operation S304. A method for acquiring the illumination information of each of the lighting devices is described with reference to FIGS. 7 and 8 below.

Figure 7:
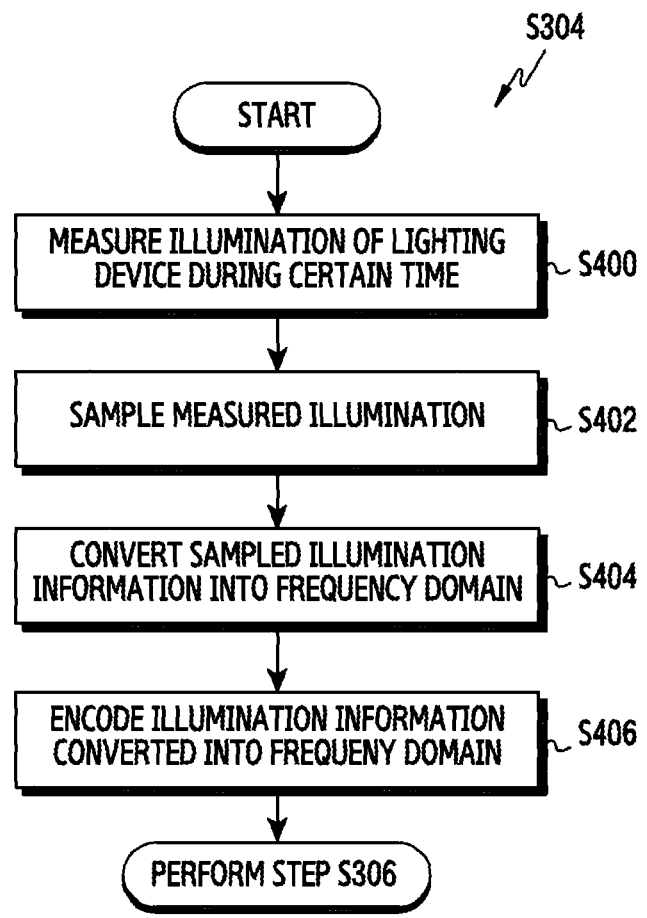
FIG. 7 is a flowchart describing an operation of detecting illumination information about the lighting device illustrated in FIG. 6.

FIG. 7 is a flowchart describing an operation of acquiring illumination information about the lighting device illustrated in FIG. 6.

Referring to FIG. 7, the electronic device 10 measures the illumination of lighting devices, which turn On/Off according to control signals, during a certain time at operation S400. The electronic device 10 uses an illumination sensor to measure the illumination of lighting devices located in a certain area.

After operation S400, the electronic device 10 samples the measured illumination at operation S402. For instance, the electronic device 10 samples the illumination, which is measured during a certain time, by periods of a certain sampling time. In case that a sampling frequency is not secured at sampling, the electronic device 10 may exploit an equivalent time sampling technique, i.e., a technique of delaying a sampling period of the measured illumination as much as a certain interval and sampling. That is, in case that a frequency of On/Off control (i.e., duty and binary) of the lighting device is relatively large, the electronic device 10 may exploit the equivalent time sampling technique.

After operation S402, the electronic device 10 converts the sampled illumination information into a frequency domain at operation S404. The sampled illumination information corresponds to synthesized illumination information about a plurality of lighting devices. To distinguish light sources of the plurality of lighting devices from the synthesized illumination of the plurality of lighting devices, the electronic device 10 converts the sampled illumination information into the frequency domain.

Figure 8:
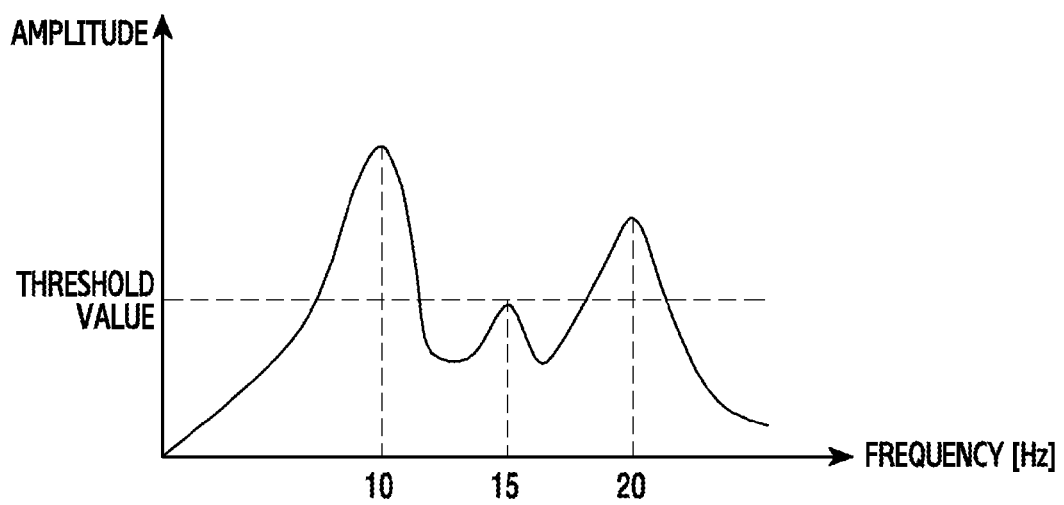
FIG. 8 is an illustrative reference diagram describing conversion of sampled illumination information into a frequency domain according to an embodiment of the present disclosure.

FIG. 8 is an illustrative reference diagram describing conversion of the sampled illumination information into the frequency domain according to an embodiment of the present disclosure.

Referring to FIG. 8, the electronic device 10 may convert the sampled illumination information into the frequency domain, thereby determining that the illumination information is constructed by three lighting devices having On/Off frequencies of 10 Hz, 15 Hz, and 20 Hz.

After operation S404, the electronic device 10 encodes the illumination information converted into the frequency domain at operation S406. If converting a sampled signal into a frequency domain, the electronic device 10 extracts a frequency of the corresponding signal and/or an amplitude thereof and performs the encoding.

After operation S304, the electronic device 10 may match the acquired illumination information with the control signal of each of the lighting devices at operation S306. For example, the electronic device 10 may determine that the respective lighting devices are lighting devices corresponding to the On/Off frequencies of 10 Hz, 15 Hz, and 20 Hz, through the encoding of the illumination information of the lighting devices. Accordingly, the electronic device 10 may identify the On/Off frequencies of 10 Hz, 15 Hz, and 20 Hz corresponding to the illumination information of the respective lighting devices, through the encoding of the illumination information, thereby matching the control signal consistent with the corresponding On/Off frequency.

After operation S306, the electronic device 10 sets up the lighting devices of which the control signals and the illumination information are matched with one other among the lighting devices, as a zone corresponding to an illumination effect degree at operation S308. Setting up the zone corresponding to the illumination effect degree of the lighting device represents recognizing a region of which the illumination is measured, and matching the region with lighting devices having a main effect in the illumination of this region to set up the region. For example, the electronic device 10 may transmit a first control signal, a second control signal, a third control signal, and a fourth control signal having respective On/Off frequencies of 10 Hz, 15 Hz, 20 Hz, and 25 Hz, to a first lighting device, a second lighting device, a third lighting device, and a fourth lighting device, respectively. In this context, the electronic device 10 may acquire illumination information whose respective On/Off frequencies are equal to 10 Hz, 15 Hz, and 20 Hz, from an illumination sensor 'A' among a plurality of illumination sensors located in different areas, and acquire illumination information whose On/Off frequency is equal to 25 Hz from an illumination sensor 'B'. Because the On/Off frequencies of 10 Hz, 15 Hz, and 20 Hz match with the first control signal, the second control signal, and the third control signal, the electronic device 10 may determine the first lighting device, the second lighting device, and the third lighting device corresponding respectively to the first control signal, the second control signal, and the third control signal, as lighting devices belonging to a zone having effect in the illumination sensor 'A'. Also, because the On/Off frequency matches to the fourth control signal, the electronic device 10 may determine the fourth lighting device corresponding to the fourth control signal, as a lighting device belonging to a zone having effect in the illumination sensor 'B'. In an embodiment of the present disclosure, setting up the lighting device belonging to the zone is a meaning including setting up a group of lighting devices based on an illumination measurement area (or position). For example, the electronic device 10 may determine the first lighting device, the second lighting device, and the third lighting device as a group 'A', and determine the fourth lighting device as a group 'B'.

Also, by comparing an amplitude of the frequency domain of the illumination information with a threshold value, the electronic device 10 may determine the existence or non-existence of the effect of a corresponding lighting device. If the amplitude is equal to or is greater than the threshold value, the electronic device 10 determines an illumination effect degree of the corresponding lighting device, and sets up the same zone of the lighting devices of which the amplitudes are equal to or are greater than the threshold value. For example, as illustrated in FIG. 8, assuming that there is illumination information about three lighting devices having On/Off frequencies of 10 Hz, 15 Hz, and 20 Hz, the electronic device 10 may compare amplitudes of the illumination information with a threshold value. In this context, the electronic device 10 may determine that the lighting device having the On/Off frequency of 15 Hz corresponding to the amplitude equal to or less than the threshold value is a lighting device having no effect in a corresponding region, i.e., zone. Also, the electronic device 10 determines that the lighting devices having the On/Off frequencies of 10 Hz and 20 Hz corresponding to the amplitudes greater than the threshold value are lighting devices having effect in the corresponding zone. For example, the electronic device 10 may divide only lighting devices having effect in a corresponding zone, into lighting devices belonging to the corresponding zone. Herein, the corresponding zone may represent a zone where a sensor (i.e., an illumination sensor or a camera sensor) detecting illumination information of lighting devices is located.

After operation S308, the electronic device 10 displays zone setup information about the lighting devices of which the zone is set up at operation S310. For example, if the three lighting devices having the On/Off frequencies of 10 Hz, 15 Hz, and 20 Hz are set up as the same zone, the electronic device 10 displays, as the zone setup information, identification information of the respective lighting devices included in the corresponding zone and zone identification information corresponding to this.

After operation S310, the electronic device 10 modifies the zone setup of the lighting devices included in the zone setup information at operation S312. For example, the electronic device 10 deletes or adds, according to a user's selection, some or all of the lighting devices belonging to the corresponding zone in the zone setup information.

Figure 9:
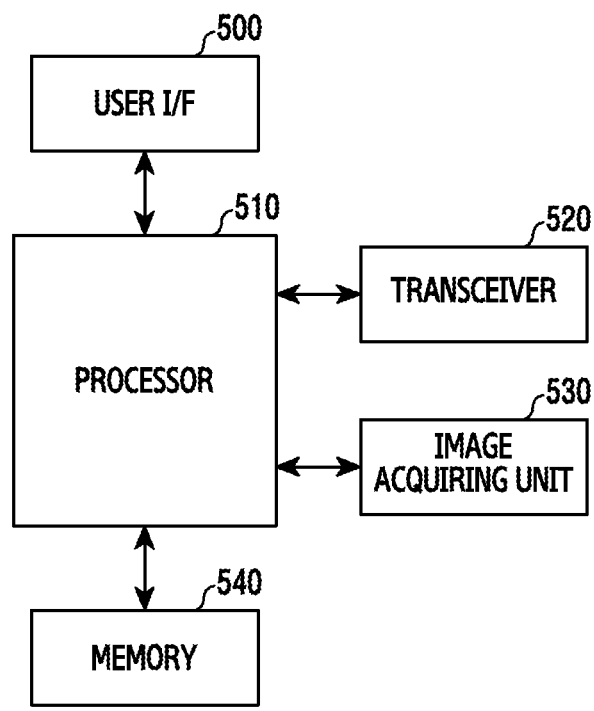
FIG. 9 is a block diagram describing an electronic device for setup of a lighting device according to an embodiment of the present disclosure.

FIG. 9 is a block diagram describing an electronic device for setup of a lighting device according to an embodiment of the present disclosure.

Referring to FIG. 9, the electronic device includes a user interface (I/F) unit 500, a processor 510, a transceiver 520, an image acquiring unit 530, and a memory 540.

The user interface unit 500 detects a request for a setup mode of the lighting device 20, and forwards the detected result to the processor 510. For this, the user interface unit 500 displays a dialog window for receiving an input of a setup mode request from a user, and detects request or non-request for the setup mode of the lighting device 20 of the user from information inputted through the dialog window.

If receiving the sensing result of the setup mode request from the user interface unit 500, the processor 510 controls to transmit a control signal corresponding to each of at least one lighting device 20, to each of the lighting device 20.

The processor 510 provides unique control signals for identifying the respective lighting devices 20, to the lighting devices 20, and instructs the lighting devices 20 to perform On/Off operations according to the control signals. The processor 510 instructs the lighting device 20 to turn On/Off using any one control signal among an On/Off frequency, an On/Off duty cycle, and On/Off binary data. That is, the processor 510 instructs each lighting device 20 to vary the On/Off frequency and turn On/Off, or instructs each lighting device 20 to vary the On/Off duty cycle and turn On/Off, or instructs each lighting device 20 to vary the On/Off binary data and turn On/Off.

The transceiver 520 transmits the control signals to the respective lighting devices 20 under the control of the processor 510. The control signals are transmitted to the lighting devices 20 through the wired or wireless network 30, respectively. In accordance with this, the respective lighting devices 20 turn On/Off lighting in accordance with the On/Off frequencies corresponding to the respective lighting devices 20, the On/Off duty cycles, or the On/Off binary data.

When the respective lighting devices 20 turn On/Off according to the unique control signals, the image acquiring unit 530 detects image information about the lighting device 20, and forwards the detecting result to the processor 510.

Figure 10:
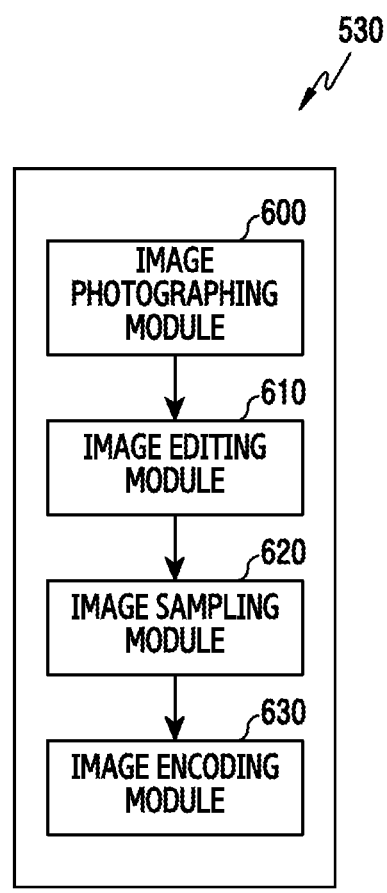
FIG. 10 is a block diagram describing an image acquiring unit, such as the image acquiring unit illustrated in FIG. 9, according to an embodiment of the present disclosure.

FIG. 10 is a block diagram describing an image acquiring unit, such as the image acquiring unit illustrated in FIG. 9, according to an embodiment of the present disclosure.

Referring to FIG. 10, the image acquiring unit 530 includes an image photographing module 600, an image editing module 610, an image sampling module 620, and an image encoding module 630.

The image photographing module 600 photographs, during a certain time, lighting devices, which turn On/Off according to control signals, and forwards the photographing result to the image editing module 610. As illustrated in FIG. 4, the image photographing module 600 photographs, during a certain time, lighting devices corresponding to respective On/Off frequencies of 10 Hz, 15 Hz, and 20 Hz. In this context, the image photographing module 600 photographs a plurality of lighting devices in a manner that the plurality of lighting devices are included on one screen. Upon photographing, the image photographing module 600 may minimize an exposure of a camera sensor to distinguish the respective lighting devices.

Also, when photographing the respective lighting devices, the image photographing module 600 may also sequentially photograph each of the lighting devices. That is, the image photographing module 600 use a panorama image photographing technique), to sequentially photograph the lighting devices during a certain time.

The image editing module 610 adjusts a photographing range of a taken image, and forwards an image of the adjusted photographing range to the image sampling module 620. The image editing module 610 uses a screen size adjustment module (not shown) to magnify or reduce a size of a range of a taken image, or use a range selection module (not shown) to select a certain range of the taken image.

The image sampling module 620 samples the taken image, and forwards sampled image information to the image encoding module 630. The image sampling module 620 samples an image, which is taken during a certain time, by periods of a certain sampling time. In case that a sampling frequency is not secured at sampling, the image sampling module 620 may exploit an equivalent time sampling technique, i.e., a technique of delaying a sampling period of the taken image as much as a certain interval and sampling. In case that sampling signals relatively faster repeated than the sampling period, the image sampling module 620 uses the equivalent time sampling.

The image encoding module 630 encodes the sampled image information, and forwards the encoding result to the processor 510. That is, the image encoding module 630 uses image information corresponding to a difference of the sampled image information to encode the image information.

In the aforementioned description, the image photographing module 600 may include a plurality of camera sensors. According to an embodiment of the present disclosure, in case that the electronic device 10 is physically divided into a portable terminal and at least one gateway, the plurality of camera sensors may be provided in each of the portable terminal and the gateway. Also, in case that the electronic device 10 is physically divided into the portable terminal and the at least one gateway, the image photographing module 600, the image editing module 610, the image sampling module 620, and the image encoding module 630 may be provided in each of the portable terminal and the gateway, or may be provided in any one of the portable terminal and the gateway.

The processor 510 determines whether the detected image information match with the control signals of the respective lighting devices, and sets up a group of the lighting devices of which the control signals and the image information match with one another among the lighting devices. For example, the processor 510 identifies identification information 10 Hz, 15 Hz, and 20 Hz of the respective lighting devices identified through the encoding of the image information, thereby matching the identified On/Off frequencies with the control signals.

Thereafter, the processor 510 uses the image information matching with the control signals, to set up a group of the lighting devices corresponding to the image information. For example, as illustrated in FIG. 4, in case that three lighting devices having the On/Off frequencies of 10 Hz, 15 Hz, and 20 Hz are included in one image information, the electronic device 10 sets up the same group of the three lighting devices that are included in the one image information.

On the other hand, the processor 510 may have program information necessary for the aforementioned operation in itself, or may store the program information in the memory 540. The memory 540 stores program information for controlling to transmit a control signal corresponding to each of at least one lighting device to each of the lighting device, program information for detecting image information of each of the lighting devices controlled according to control signals, program information for determining whether the detected image information matches with the control signal of each of the lighting devices, and program information for setting up a group of the lighting devices of which the control signals and the image information match with one another among the lighting devices. Also, the memory 540 stores group setup information. For instance, at least one operation (or function) performed in the image acquiring unit 530 may be carried out in the processor 510.

After setting up the group, the user interface unit 500 displays group setup information about the lighting devices of which the group is set up. For example, as illustrated in FIG. 4, if the three lighting devices having the On/Off frequencies of 10 Hz, 15 Hz, and 20 Hz are set up as the same group, the user interface unit 500 displays, as the group setup information, identification information of the respective lighting devices included in the corresponding group and group identification information corresponding to this.

Also, the user interface unit 500 modifies the group setup of the lighting devices included in the group setup information. According to a user's selection, the user interface unit 500 deletes or adds some or all of the lighting devices belonging to the corresponding group in the group setup information.

Figure 11:
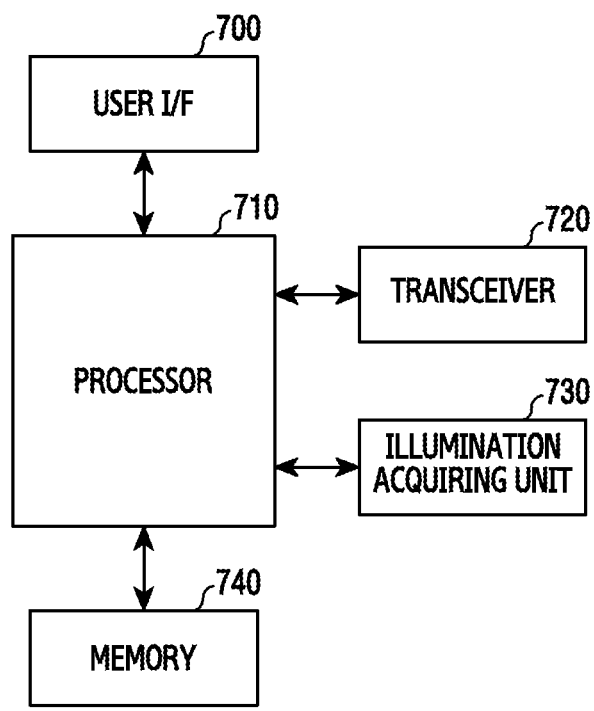
FIG. 11 is a block diagram describing an electronic device for setup of a lighting device according to an embodiment of the present disclosure.

FIG. 11 is a block diagram describing an electronic device for setup of a lighting device according to an embodiment of the present disclosure.

Referring to FIG. 11, the electronic device includes a user interface unit 700, a processor 710, a transceiver 720, an illumination acquiring unit 730, and a memory 740.

The user interface unit 700 detects a request for a setup mode of the lighting device 20, and forwards the detected result to the processor 710. For this, the user interface unit 700 displays a dialog window for receiving an input of a setup mode request from a user, and detects request or non-request for the setup mode of the lighting device 20 of the user from information inputted through the dialog window.

If receiving the sensing result of the setup mode request from the user interface unit 700, the processor 710 controls to transmit a control signal corresponding to each of at least one lighting device 20, to each of the lighting device 20.

The processor 710 provides unique control signals for identifying the respective lighting devices 20, to the lighting devices 20, and instructs the lighting devices 20 to perform On/Off operations according to the control signals. The processor 710 instructs the lighting device to turn On/Off using any one control signal among an On/Off frequency, an On/Off duty cycle, and On/Off binary data.

The transceiver 720 transmits the control signals to the respective lighting devices 20 under the control of the processor 710. The control signals are transmitted to the lighting devices 20 through the wired or wireless network 30, respectively. In accordance with this, the respective lighting devices 20 turn On/Off lighting in accordance with the On/Off frequencies corresponding to the respective lighting devices, the On/Off duty cycles, or the On/Off binary data.

When the respective lighting devices 20 turn On/Off according to the unique control signals, the illumination acquiring unit 730 detects illumination information about the lighting device 20, and forwards the detecting result to the processor 710.

Figure 12:
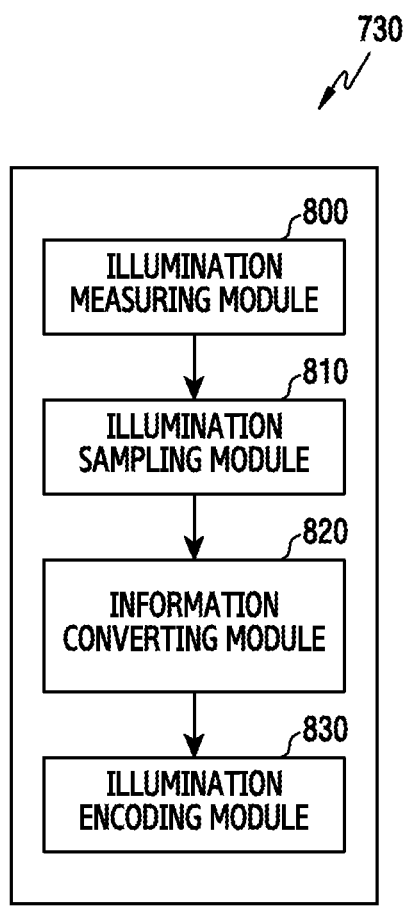
FIG. 12 is a block diagram describing an illumination acquiring unit, such as the illumination acquiring unit illustrated in FIG. 11, according to an embodiment of the present disclosure.

FIG. 12 is a block diagram describing an illumination acquiring unit, such as the illumination acquiring unit illustrated in FIG. 11, according to an embodiment of the present disclosure.

Referring to FIG. 12, the illumination acquiring unit 730 includes an illumination measuring module 800, an illumination sampling module 810, an information converting module 820, and an illumination encoding module 830.

The illumination measuring module 800 measures, during a certain time, the illumination of a lighting device that turns On/Off according to a control signal, and forwards the measuring result to the illumination sampling module 810. For this, the illumination measuring module 800 may include an illumination sensor (not shown) or a camera sensor. For example, the illumination measuring module 800 may control the camera sensor to measure the illumination of the lighting device during a certain time.

The illumination sampling module 810 samples the measured illumination, and forwards sampled illumination information to the information converting module 820. The illumination sampling module 810 samples the illumination, which is measured during the certain time, by periods of a certain sampling time. In case that a sampling frequency is not secured at sampling, the illumination sampling module 810 may exploit an equivalent time sampling technique, i.e., a technique of delaying a sampling period of the measured illumination as much as a certain interval and sampling. In case that sampling signals relatively faster repeated than the sampling period, the illumination sampling module 810 uses the equivalent time sampling.

The information converting module 820 converts the sampled illumination information into a frequency domain, and forwards the converting result to the illumination encoding module 830. The sampled illumination information corresponds to synthesized illumination information about a plurality of lighting devices. Accordingly, to distinguish light sources of the respective lighting devices from the synthesized illumination of the plurality of lighting devices, the information converting module 820 converts the illumination information into the frequency domain. As illustrated in FIG. 8, by converting the sampled illumination information into the frequency domain, the information converting module 820 may determine that the illumination information is constructed by three lighting devices having On/Off frequencies of 10 Hz, 15 Hz, and 20 Hz.

The illumination encoding module 830 encodes the illumination information converted into the frequency domain, and forwards the encoding result to the processor 710.

In the aforementioned description, the illumination measuring module 800 may include a plurality of illumination sensors and/or a plurality of camera sensors. According to an embodiment of the present disclosure, in case that the electronic device 10 is physically divided into a portable terminal and at least one gateway, the plurality of illumination sensors and/or the plurality of camera sensors may be provided in each of the portable terminal and the gateway. Also, in case that the electronic device 10 is physically divided into the portable terminal and the at least one gateway, the illumination measuring module 800, the illumination sampling module 810, the information converting module 820, and the illumination encoding module 830 may be provided in each of the portable terminal and the gateway, or may be provided in any one of the portable terminal and the gateway.

The processor 710 determines whether the detected illumination information matches with the control signals of the respective lighting devices, and sets up a group of the lighting devices of which the control signals and the illumination information match with one another among the lighting devices. For example, the processor 710 identifies identification information 10 Hz, 15 Hz, and 20 Hz of the respective lighting devices identified through the encoding of the illumination information, thereby matching the identified On/Off frequencies with the control signals.

Thereafter, the processor 710 uses the illumination information matching the control signals, to set up a zone of the lighting devices corresponding to the illumination information. The processor 710 compares an amplitude of a frequency domain of the illumination information with a threshold value, to determine an illumination effect degree, and sets up the same zone of the lighting devices having frequency domains whose amplitudes are equal to or are greater than the threshold value. For example, as illustrated in FIG. 8, assuming that there is illumination information about three lighting devices having On/Off frequencies of 10 Hz, 15 Hz, and 20 Hz, the processor 710 compares amplitudes of the frequencies of the illumination information with a threshold value, to determine that the light device having the On/Off frequency of 15 Hz of the amplitude equal to or less than the threshold value is a lighting device having no effect in a corresponding region, i.e., zone, and determine that the lighting devices having the On/Off frequencies of 10 Hz and 20 Hz of the amplitudes greater than the threshold value are lighting devices having effect in a corresponding zone.

On the other hand, the processor 710 may have program information necessary for the aforementioned operation in itself, or may store the program information in the memory 740. The memory 740 stores program information for controlling to transmit a control signal corresponding to each of at least one lighting device to each of the lighting device, program information for detecting illumination information of each of the lighting devices controlled according to control signals, program information for determining whether the detected illumination information matches with the control signal of each of the lighting devices, and program information for setting up a zone of the lighting devices of which the control signals and the illumination information match with one another among the lighting devices. Also, the memory 740 stores zone setup information. For instance, at least one operation (or function) performed in the illumination acquiring unit 730 may be carried out in the processor 710.

After setting up the zone, the user interface unit 700 displays zone setup information about the lighting devices of which the zone is set up. For example, if the three lighting devices having the On/Off frequencies of 10 Hz, 15 Hz, and 20 Hz are set up as the same zone, the user interface unit 700 displays, as the zone setup information, identification information of the respective lighting devices included in the corresponding zone and zone identification information corresponding to this.

Also, the user interface unit 700 modifies the zone setup of the lighting devices included in the zone setup information. According to a user's selection, the user interface unit 700 deletes or adds some or all of the lighting devices selected by a user among the lighting devices belonging to the corresponding zone in the zone setup information.

In the aforementioned embodiment of the present disclosure, a description has been made in which the electronic device 10 transmits control signals controlling On/Off of lighting devices to the lighting devices, and acquires On/Off related information of the lighting devices and determines a group of the lighting devices.

According to various embodiments of the present disclosure, the electronic device 10 may control illumination values or colors of lighting devices and determine a group of the lighting devices. Below, a description is made for various embodiments of controlling illumination values or colors of lighting devices and determining a group of the lighting devices.

Figure 13:
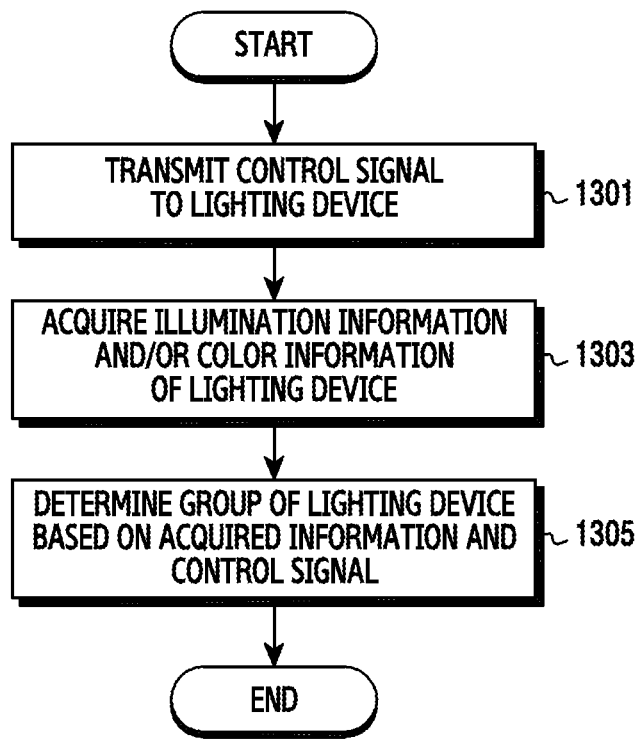
FIG. 13 is a flowchart describing a method for determining a group of lighting devices in an electronic device according to an embodiment of the present disclosure.

FIG. 13 is a flowchart describing a method for determining a group of lighting devices in an electronic device according to an embodiment of the present disclosure.

Referring to FIG. 13, the electronic device transmits a control signal corresponding to at least one lighting device at operation 1301. The control signal may comprise at least one of illumination control information and color control information in order to control the at least one lighting device. For example, the control signal may include at least one of a color value of the lighting device, an illumination value of the lighting device, an illumination level of the lighting device, and an illumination control time point of the lighting device.

The electronic device acquires at least one of illumination information and color information of the at least one lighting device using at least one sensor at operation 1303. The at least one sensor may comprise a camera sensor, or an illumination sensor. For example, the electronic device may acquire illumination values of the at least one lighting device using the illumination sensor during a certain time. As another example, the electronic device may acquire a plurality of an images comprising the illumination information of the at least one lighting device using the camera sensor. As yet another example, the electronic device may acquire at least one image comprising the color information of the at least one lighting device using the camera sensor.

The electronic device determines a group of the at least one lighting device based on the acquired information and the control signal at operation 1305.

Figure 14:
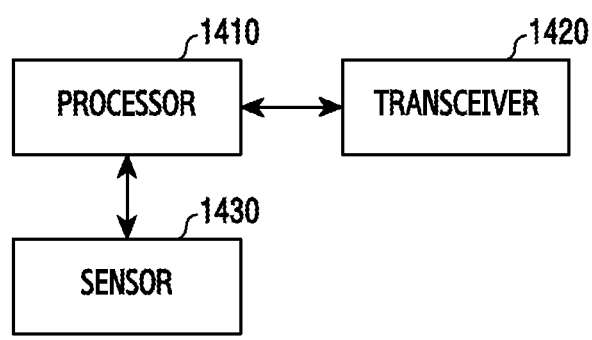
FIG. 14 is a block diagram describing an electronic device for determining a group of lighting devices according to an embodiment of the present disclosure.

FIG. 14 is a block diagram describing an electronic device for determining a group of lighting devices according to an embodiment of the present disclosure.

Referring to FIG. 14, the electronic device includes a processor 1410, a transceiver 1420, and a sensor 1430.

The processor 1410 acquires On/Off related information of the at least one lighting device, and determines a group of the at least one lighting device based on the On/Off related information and the control signal.

The transceiver 1420 transmits a control signal corresponding to at least one lighting device. The control signal may comprise at least one of illumination control information and color control information in order to control the at least one lighting device. For example, the control signal may include at least one of a color value of the lighting device, an illumination value of the lighting device, an illumination level of the lighting device, and an illumination control time point of the lighting device.

The sensor unit 1430 acquires at least one of illumination information and color information of the at least one lighting device using at least one sensor at operation 1303. The sensor unit 1430 may comprise a camera sensor, or an illumination sensor. For example, the sensor unit 1430 may acquire illumination values of the at least one lighting device using the illumination sensor during a certain time. Another example, the sensor unit 1430 may acquire a plurality of an images comprising the illumination information of the at least one lighting device using the camera sensor. Another example, the sensor unit 1430 may acquire at least one image comprising the color information of the at least one lighting device using the camera sensor.

According to an embodiment of the present disclosure, the electronic device 10 may determine a group of respective lighting devices on the basis of a variation of an illumination value (or a difference value of a measured illumination value). For instance, the electronic device 10 may transmit a control signal controlling each illumination value of a plurality of lighting devices to the lighting device, and acquire the illumination values of the plurality of lighting devices from at least one sensor (e.g., an illumination sensor or a camera sensor), and thereafter determine a group of the lighting devices based on the acquired illumination values. For example, the electronic device 10 may transmit a first control signal including an illumination value 'A' to a first lighting device and thereafter, transmit a second control signal including an illumination value 'B' to a second lighting device and thereafter, transmit a third control signal including an illumination value 'C' to a third lighting device. In accordance with this, the first lighting device, the second lighting device, and the third lighting device may receive the control signals at temporally different time points, and control the lighting values sequentially in accordance with the control signal reception time points. The electronic device 10 may measure an illumination value through an illumination sensor provided in the electronic device 10 or an illumination sensor wiredly or wirelessly connected with the electronic device 10. The electronic device 10 may determine a group of each of the first lighting device, the second lighting device, and the third lighting device, based on the measured illumination value and a variation of the illumination value.

For example, it is assumed that firstly, the first lighting device controls an illumination value in accordance with the first control signal and next, the second lighting device controls an illumination value in accordance with the second control signal and lastly, the third lighting device changes an illumination value in accordance with the third control signal. Firstly, the electronic device 10 may use at least one illumination sensor to measure an illumination value sensed before the first lighting device changes the illumination value and an illumination value after the first lighting device changes the illumination value, and determine whether the first lighting device has effect in an area corresponding to each illumination sensor, based on a difference value of the illumination values measured in each illumination sensor. If a difference value of illumination values measured in a first illumination sensor is greater than a threshold value, and a difference value of illumination values measured in a second illumination sensor is less than the threshold value, the electronic device 10 may regard the first lighting device as a lighting device having effect in an area corresponding to the first illumination sensor, and determine that the first lighting device belongs to the area corresponding to the first illumination sensor.

Also, the electronic device 10 may use at least one illumination sensor to measure an illumination value sensed before the second lighting device changes the illumination value and an illumination value after the second lighting device changes the illumination value, and determine whether the second lighting device has effect in an area corresponding to each illumination sensor, based on a difference value of the illumination values measured in each illumination sensor. If a difference value of illumination values measured in the first illumination sensor is greater than the threshold value, and a difference value of illumination values measured in the second illumination sensor is less than the threshold value, the electronic device 10 may regard the second lighting device as a lighting device having effect in an area corresponding to the first illumination sensor, and determine that the second lighting device belongs to the area corresponding to the first illumination sensor.

Also, the electronic device 10 may use at least one illumination sensor to measure an illumination value sensed before the third lighting device changes the illumination value and an illumination value after the third lighting device changes the illumination value, and determine whether the third lighting device has effect in an area corresponding to each illumination sensor, based on a difference value of the illumination values measured in each illumination sensor. If a difference value of illumination values measured in the first illumination sensor is less than the threshold value, and a difference value of illumination values measured in the second illumination sensor is greater than the threshold value, the electronic device 10 may regard the third lighting device as a lighting device having effect in an area corresponding to the second illumination sensor, and determine that the third lighting device belongs to the area corresponding to the second illumination sensor. Accordingly to this, the electronic device 10 may determine as a first group the first lighting device and the second lighting device belonging to the area corresponding to the first illumination sensor, and determine as a second group the third lighting device belonging to the area corresponding to the second illumination sensor.

In the aforementioned embodiment of the present disclosure, the electronic device 10 transmits the control signals to the respective lighting devices at different time points, and leads the lighting devices to control the illumination values at the different time points. However, according to an embodiment of the present disclosure, the electronic device 10 may transmit a control signal including an illumination value and illumination value control time point information, to the lighting device. In this case, time points at which the electronic device 10 transmits control signals to a plurality of lighting devices may be the same as or be different from one another.

According to an embodiment of the present disclosure, the electronic device 10 may control a level of an illumination value and determine a group of respective lighting devices.

The electronic device 10 may divide illumination values expressible by a lighting device into certain levels, and control an illumination level of each lighting device, and determine a group of the respective lighting devices. For instance, the electronic device 10 may transmit a control signal, which controls an illumination value of each of a plurality of lighting devices to a certain illumination level, to a lighting device, and acquire an image including the illumination values of the plurality of lighting devices from at least one sensor (e.g., a camera sensor) and thereafter, determine a group of the lighting devices based on the illumination value within the acquired image. For example, the electronic device 10 may divide the illumination level into four levels (e.g., a first level—25%, a second level—50%, a third level—75%, and a fourth level—100%). The electronic device 10 may transmit a first control signal, which requests to control the illumination level to the first level, to the first lighting device, and transmit a second control signal, which requests to control the illumination level to the second level, to the second lighting device, and transmit a third control signal, which requests to control the illumination level to the third level, to the third lighting device. Accordingly to this, the first lighting device, the second lighting device, and the third lighting device may receive the control signals, and control illumination output values of lighting in accordance with the illumination levels included in the control signals. The electronic device 10 may acquire an image of a lighting device through a camera sensor provided in the electronic device 10 or a camera sensor wiredly or wirelessly with the electronic device 10. For example, the electronic device 10 may acquire a first image corresponding to a time point before each lighting device controls an illumination level and a second image corresponding to a time point after the lighting device controls the illumination level. The electronic device 10 may measure a first average illumination value of the whole region of the first image and a second average illumination value of the whole region of the second image, and determine a difference value of the first average illumination value and the second average illumination value. Also, the electronic device 10 may measure an illumination value of each lighting device included in the first image and an illumination value of each lighting device included in the second image, and determine an illumination difference value of each lighting device. Based on a rate of the difference value of the first average illumination value and the second average illumination value and the illumination difference value of each lighting device, the electronic device 10 may identify a lighting device included in the first image and the second image, and determine a group of the identified lighting devices.

For example, it is assumed that the first lighting device controls an illumination level of output lighting to a first level in accordance with a first control signal, and the second lighting device controls an illumination level of output lighting to a second level in accordance with a second control signal, and the third lighting device controls an illumination level of output lighting to a third level in accordance with a third control signal. The electronic device 10 may use at least one camera sensor to acquire a first image corresponding to a time point before transmitting the first to third control signals, and acquire a second image corresponding to a time point after transmitting the first to third control signals. The electronic device 10 may measure that an illumination difference value of a first region within the first image and the second image is equal to 'A', and an illumination difference value of a second region is equal to 'B'. The electronic device 10 may use a rate of a difference value of an average illumination of the first image and the second image and an illumination difference value 'A' of the first region, to identify that a lighting device corresponding to the first region is the first lighting device.

Also, the electronic device 10 may use a rate of a value of an average illumination difference of the first image and the second image and an illumination difference value 'B' of the second region, to identify that a lighting device corresponding to the second region is the second lighting device. The electronic device 10 may determine that the first lighting device and the second lighting device are included in the first image and the second image, and determine the first lighting device and the second lighting device as one group. Also, because the third lighting device is not included in the first image and the second image, the electronic device 10 may determine the third lighting device as a different group.

According to an embodiment of the present disclosure, the electronic device 10 may control a color of a lighting device and determine a group of respective lighting devices. For instance, the electronic device 10 may transmit a control signal controlling a color of each of a plurality of lighting devices to the lighting device, and acquire color information of the plurality of lighting devices from at least one sensor (e.g., a camera sensor, or a Red, Green, Blue (RGB) sensor) and thereafter, determine a group of the lighting devices based on the acquired color information. For example, the electronic device 10 may transmit a first control signal including a color value 'A' to the first lighting device and thereafter, transmit a second control signal including a color value 'B' to the second lighting device and thereafter, transmit a third control signal including a color value 'C' to the third lighting device. The electronic device 10 may acquire an image photographing at least one lighting device through a camera sensor provided in the electronic device 10 or a camera sensor (or a camera device) wiredly or wirelessly connected with the electronic device 10. The electronic device 10 may match color information of lighting devices included in an image with control signals and, based on the matching result, determine a group of each of the first lighting device, the second lighting device, and the third lighting device.

For example, it is assumed that the first lighting device outputs lighting of color corresponding to a first RGB value based on a first control signal, and the second lighting device outputs lighting of color corresponding to a second RGB value based on a second control signal, and the third lighting device outputs lighting of color corresponding to a third RGB value based on a third control signal. The electronic device 10 may use at least one camera sensor to acquire at least one image including at least one of the first lighting device, the second lighting device, and the third lighting device, and determine color information of lighting included within each image. The electronic device 10 may compare color information of lighting included in each image and color information included in each control signal, and identify a lighting device included in each image. Thereafter, the electronic device 10 may determine a lighting device included in one image, as one group. For example, in case that two lighting devices exist within a first image, and color information of each of the two lighting devices is the same as color information included in a first control signal and color information included in a second control signal, the electronic device 10 may determine that the lighting devices included in the first image are the first lighting device and the second lighting device, and determine the first lighting device and the second lighting device as one group. Also, in case that one lighting device exists within the second image, and color information of one lighting device is the same as color information included in a third control signal, the electronic device 10 may determine that the lighting device included in the second image is the third lighting device, and determine the third lighting device as a different group.

As described above, the present disclosure may determine a group or zone of lighting devices in various schemes, thereby controlling lighting in units of groups. For example, the present disclosure may turn On/Off, at one time, lighting devices belonging to a first group or first zone in response to a user request.

Also, according to the present disclosure, there is an effect of minimizing a user's error of setup of a lighting device and making possible efficient setup and use, by intuitively performing group or zone setup of lighting devices located in a certain area in an electronic device.

Also, there is an effect of being capable of performing efficient control on the basis of a zone, by extracting an illumination effect degree by lighting device in an electronic device.

Methods according to various embodiments stated in the claims or specification of the present disclosure may be implemented in a form of hardware, software, or a combination of hardware and software. If the methods are implemented by software, a computer-readable storage medium storing one or more programs (i.e., software modules) may be provided. The one or more programs stored in the computer-readable storage medium are configured to be executed by one or more processors within an electronic device. The one or more programs may include instructions for enabling the electronic device to execute the methods according to the embodiments stated in the claims and/or specification of the present disclosure.

These programs (i.e., software modules or software) may be stored in a Random Access Memory (RAM), a nonvolatile memory including a flash memory, a Read Only Memory (ROM), an Electrically Erasable Programmable ROM (EEPROM), a magnetic disk storage device, a Compact Disk ROM (CD-ROM), a Digital Versatile Disc (DVD) or an optical storage device of other form, and a magnetic cassette. Or, the programs may be stored in a memory constructed by a combination of some or all of them. Also, each constructed memory may be also included in plural.

Also, the programs may be stored in an attachable storage device accessible to an electronic device through a communication network such as the Internet, an intranet, a Local Area Network (LAN), a Wireless LAN (WLAN) or a Storage Area Network (SAN) or a communication network constructed by a combination of them. This storage device may also access the electronic device through an external port. Also, a separate storage device on the communication network may also access a portable electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
    transmitting each of at least one control signal to each of at least one lighting device which generates on/off related information according to the at least one control signal;
    acquiring the on/off related information by photographing the at least one lighting device; and
    setting a group of one or more lighting devices from the at least one lighting device based on the acquired on/off related information.

2. The method of claim 1,
    wherein the on/off related information comprises at least one of an on/off frequency of the at least one lighting device and an on/off duty cycle of the at least one lighting device, and
    wherein the on/off related information is acquired by at least one of a camera sensor and an illumination sensor.

3. The method of claim 1, wherein the at least one control signal comprises at least one of an on/off frequency of the at least one lighting device, an on/off duty cycle, and information for controlling an on/off state.

4. The method of claim 1, wherein the acquiring of the on/off related information by photographing the at least one lighting device comprises:
generating an image by photographing the at least one lighting device during a certain time;
sampling the image; and
using image information corresponding to a difference of the sampled image to encode image information and acquire the on/off related information of the at least one lighting device.

5. The method of claim 1, wherein the acquiring of the on/off related information by photographing the at least one lighting device comprises:
measuring an illumination level of the at least one lighting device during a certain time;
sampling the measured illumination level;
converting sampled illumination level information into a frequency domain; and
acquiring the on/off related information of the at least one lighting device by encoding the sampled illumination level information converted into the frequency domain.

6. The method of claim 5, wherein the setting of the group of the one or more lighting devices from the at least one lighting device based on the acquired on/off related information comprises:
comparing amplitudes of the frequency domains of the sampled illumination level information with a threshold value; and
determining a group of one or more lighting devices from the at least one lighting device having the sampled illumination level information of the frequency domains of which the amplitudes are equal to or are greater than the threshold value.

7. The method of claim 1, further comprising, after the setting of the group of the one or more lighting devices from the at least one lighting device based on the acquired on/off related information, displaying group information about the group of the one or more lighting devices from the at least one lighting device.

8. A method of an electronic device, the method comprising:
transmitting each of at least one control signal to each of at least one lighting device which generates at least one of illumination information and color information according to the at least one control signal;
acquiring the at least one of the illumination information and the color information by photographing the at least one lighting device; and
setting a group of one or more lighting devices from the at least one lighting device based on the acquired at least one of the illumination information and the color information.

9. The method of claim 8, wherein the acquiring of the at least one of the illumination information and the color information by photographing the at least one lighting device comprises:
measuring at least one of an illumination and a color of the at least one lighting device using at least one sensor; or
acquiring the at least one of the illumination and the color of the at least one lighting device from an image acquired by at least one camera sensor.

10. The method of claim 8, wherein the at least one control signal comprises at least one of a color value of the at least one lighting device, an illumination value of the at least one lighting device, an illumination level of the at least one lighting device, and an illumination control time point of the at least one lighting device.

11. An electronic device comprising:
a transceiver configured to transmit each of at least one control signal to each of at least one lighting device which generates on/off related information according to the at least one control signal; and
a processor configured to:
acquire the on/off related information by photographing the at least one lighting device, and
set a group of one or more lighting devices from the at least one lighting device based on the acquired on/off related information.

12. The device of claim 11, further comprising:
at least one of a camera sensor and an illumination sensor,
wherein the on/off related information comprises at least one of an on/off frequency of the at least one lighting device and an on/off duty cycle of the at least one lighting device, and
wherein the on/off related information is acquired by at least one of a camera sensor and an illumination sensor.

13. The device of claim 11, wherein the at least one control signal comprises at least one of an on/off frequency of the at least one lighting device, an on/off duty cycle, and information for controlling an on/off state.

14. The device of claim 11, wherein the processor is further configured to:
generate an image by photographing the at least one lighting device during a certain time;
sample the image; and
use image information corresponding to a difference of the sampled image to encode image information and acquire the on/off related information of the at least one lighting device.

15. The device of claim 11, wherein the processor is further configured to:
measure an illumination level of the at least one lighting device during a certain time;
sample the measured illumination level;
convert the sampled illumination level information into a frequency domain; and
encode the sampled illumination level information converted into the frequency domain and acquire the on/off related information of the at least one lighting device based on encoding result.

16. The device of claim 15, wherein the processor is further configured to:
compare amplitudes of the frequency domains of the sampled illumination level information with a threshold value; and
determine the group of the one or more lighting devices from the at least one lighting device having the sampled illumination level information of the frequency domains of which the amplitudes are equal to or are greater than the threshold value.

17. The device of claim 11, further comprising:
a display,
wherein the processor is further configured to, after the setting of the group of the one or more lighting devices from the at least one lighting device based on the acquired on/off related information, display group information about the at least one lighting device.

18. An electronic device comprising:
a transceiver configured to transmit each of at least one control signal to each of at least one lighting device which generates at least one of illumination information and color information according to the at least one control signal; and a processor configured to:
acquire the at least one of the illumination information and the color information by photographing the at least one lighting device, and
set a group of one or more lighting devices from the at least one lighting device based on the acquired at least one of the illumination information and the color information.

19. The device of claim 18, further comprising:
a camera sensor or an illumination sensor,
wherein the processor is further configured to:
measure the at least one of the illumination and the color of the at least one lighting device using the camera sensor or the illumination sensor, or
acquire the at least one of the illumination and the color of the at least one lighting device from an image acquired by the camera sensor.

20. The device of claim 18, wherein the at least one control signal comprises at least one of a color value of the at least one lighting device, an illumination value of the at least one lighting device, an illumination level of the at least one lighting device, and an illumination control time point of the at least one lighting device.

\* \* \* \* \*